(12) United States Patent
Choi et al.

(10) Patent No.: US 11,191,074 B2
(45) Date of Patent: Nov. 30, 2021

(54) METHOD AND APPARATUS FOR CONFIGURING SIDELINK RESOURCES IN COMMUNICATION SYSTEM

(71) Applicants: Hyundai Motor Company, Seoul (KR); Kia Motors Corporation, Seoul (KR); Industry-Academic Cooperation Foundation, Dankook University, Gyeonggi-do (KR)

(72) Inventors: Su Han Choi, Gyeonggi-do (KR); Gene Beck Hahn, Gyeonggi-do (KR)

(73) Assignees: Hyundai Motor Company, Seoul (KR); Kia Motors Corporation, Seoul (KR); Industry-Academic Cooperation Foundation, Dankook University, Gyeonggi-do (KR)

( * ) Notice: Subject to any disclaimer, the term of this patent is extended or adjusted under 35 U.S.C. 154(b) by 0 days.

(21) Appl. No.: 16/553,694

(22) Filed: Aug. 28, 2019

(65) Prior Publication Data

US 2020/0077391 A1 Mar. 5, 2020

Related U.S. Application Data

(60) Provisional application No. 62/724,384, filed on Aug. 29, 2018.

(30) Foreign Application Priority Data

Jul. 31, 2019 (KR) .......... 10-2019-0093447

(51) Int. Cl.
*H04W 72/04* (2009.01)
*H04W 92/18* (2009.01)
(Continued)

(52) U.S. Cl.
CPC ......... *H04W 72/0446* (2013.01); *H04W 4/40* (2018.02); *H04W 72/042* (2013.01);
(Continued)

(58) Field of Classification Search
USPC ......................................... 370/329
See application file for complete search history.

(56) References Cited

U.S. PATENT DOCUMENTS

2016/0302250 A1* 10/2016 Sheng ............... H04W 4/70
2018/0048994 A1* 2/2018 Kwon ............... H04W 72/04
(Continued)

FOREIGN PATENT DOCUMENTS

EP 3444990 A1 2/2019

OTHER PUBLICATIONS

3GPP, Document No. R2-150645, Meeting #89 Athens, Greece Feb. 9-13, 2015 (Year: 2015).*
(Continued)

*Primary Examiner* — Jamaal Henson
(74) *Attorney, Agent, or Firm* — Mintz Levin Cohn Ferris Glovsky and Popeo, P.C.; Peter F. Corless

(57) ABSTRACT

A sidelink communication method performed by a first UE in a communication system is provided. The method includes receiving, from a base station, a first message including a first indicator that indicates sidelink transmission (ST) resources used for sidelink transmission and sidelink reception (SR) resources used for sidelink reception and identifying the ST resources and the SR resources indicated by the first indicator included in the first message. Sidelink communication is then performed with a second UE using the ST resources and the SR resources.

15 Claims, 10 Drawing Sheets

(51) Int. Cl.
*H04W 88/04* (2009.01)
*H04W 4/40* (2018.01)
*H04W 76/27* (2018.01)

(52) U.S. Cl.
CPC ........... *H04W 76/27* (2018.02); *H04W 88/04* (2013.01); *H04W 92/18* (2013.01)

(56) References Cited

U.S. PATENT DOCUMENTS

| | | | |
|---|---|---|---|
| 2018/0124707 A1* | 5/2018 | Lee | H04W 72/0406 |
| 2018/0214707 A1* | 8/2018 | Li | A61K 41/00 |
| 2018/0220388 A1* | 8/2018 | Chae | H04W 76/14 |
| 2018/0309513 A1* | 10/2018 | Kim | H04B 7/2643 |

OTHER PUBLICATIONS

ETSI TS 136 321 v14.4.0 (Oct. 2017) LTE; Evolved Universal Terrestrial Radio Access (E-UTRA); Medium Access Control (MAC) Protocol Specification (3GPP TS 36.321 Version 14.4.0 Release 14) (Year: 2017).*

3GPP TSG-RAN WG2 Meeting #89 Athens, Greece, Feb. 9-13, 2015, Doc No. R2-150645 (Year: 2015).*

"On Synchronization for NR V2X", Xiaomi Communications, R1-1809177, 3GPP TSG RAN WG1 Meeting #94, Gothenburg, Sweden, Aug. 20-24, 2018, 2 pages.

"Sidelink Physical Layer Structure and Procedure for NR V2X", Huawei, HiSilicon, R1-1808093, 3GPP TSG RAN WG1 Meeting #94, Gothenburg, Sweden, Aug. 20-24, 2018, 6 pages.

* cited by examiner

METHOD AND APPARATUS FOR CONFIGURING SIDELINK RESOURCES IN COMMUNICATION SYSTEM

CROSS-REFERENCE TO RELATED APPLICATIONS

This application claims the benefit of priorities to U.S. Provisional Patent Application No. 62/724,384, filed on Aug. 29, 2018 with the U.S. Patent and Trademark Office, and Korean Patent Application No. 10-2019-0093447, filed on Jul. 31, 2019 in the Korean Intellectual Property Office (KIPO), the entire contents of which are incorporated herein by reference.

BACKGROUND

1. Technical Field

The present disclosure relates generally to sidelink communication technology, and more specifically, to a technique for configuring sidelink resources.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system supports Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

The sidelink communications may be performed using sidelink resources. However, methods for configuring sidelink resources are not explicitly defined in the 3GPP LTE specifications or the 3GPP NR specifications. Therefore, methods for configuring sidelink resources are needed.

SUMMARY

Accordingly, exemplary embodiments of the present disclosure provide a method and an apparatus for configuring sidelink resources.

According to the exemplary embodiments of the present disclosure, a sidelink communication method performed by a first user equipment (UE) in a communication system may include receiving, from a base station, a first message including a first indicator indicating sidelink transmission (ST) resources used for sidelink transmission and sidelink reception (SR) resources used for sidelink reception; identifying the ST resources and the SR resources indicated by the first indicator included in the first message; and performing sidelink communication with a second UE using the ST resources and the SR resources.

The first indicator may include at least one of information indicating a number of consecutive ST slots used for the sidelink transmission, information indicating a number of consecutive ST symbols located before a starting ST slot among the consecutive ST slots, information indicating a number of consecutive ST symbols located after an ending ST slot among the consecutive ST slots, information indicating an index of the starting ST slot, and information indicating an index of the ending ST slot.

The first indicator may include at least one of information indicating a number of consecutive SR slots used for the sidelink reception, information indicating a number of consecutive SR symbols located before a starting SR slot among the consecutive SR slots, information indicating a number of consecutive SR symbols located after an ending SR slot among the consecutive SR slots, information indicating an index of the starting SR slot, and information indicating an index of the ending SR slot.

The first indicator may be a slot format indicator (SFI) and the SFI may indicate formats of symbols belonging to a slot or a mini-slot, and each of the symbols may have a format of a downlink (DL) symbol, an uplink (UL) symbol, a flexible (FL) symbol, an ST symbol, or an SR symbol. The first message may be received via one or more of system information, a radio resource control (RRC) message, a medium access control (MAC) control element (CE), and a downlink control information (DCI).

The sidelink communication method may further include, before performing of the sidelink communication, transmitting, to the base station, a second message including a second indicator requesting activation of the ST resources and the SR resources; and receiving, from the base station, a third message including a third indicator indicating that the ST resources and the SR resources are activated.

The second message may be uplink control information (UCI), and the UCI may be transmitted to the base station via a physical uplink control channel (PUCCH). The third message may include at least one of information indicating a time duration for which the ST resources and the SR resources are activated and information indicating a frequency band in which the ST resources and the SR resources are configured.

Furthermore, according to exemplary embodiments of the present disclosure, an operation method of a base station supporting sidelink communication in a communication system may include configuring sidelink transmission (ST) resources used for sidelink transmission and sidelink reception (SR) resources used for sidelink reception; generating a first message including a first indicator that indicates the ST resources and the SR resources;

and transmitting the first message to a user equipment (UE).

The first indicator may include at least one of information indicating a number of consecutive ST slots used for the sidelink transmission, information indicating a number of consecutive ST symbols located before a starting ST slot among the consecutive ST slots, information indicating a number of consecutive ST symbols located after an ending ST slot among the consecutive ST slots, information indicating an index of the starting ST slot, and information indicating an index of the ending ST slot.

The first indicator may include at least one of information indicating a number of consecutive SR slots used for the sidelink reception, information indicating a number of consecutive SR symbols located before a starting SR slot among the consecutive SR slots, information indicating a number of consecutive SR symbols located after an ending SR slot among the consecutive SR slots, information indicating an index of the starting SR slot, and information indicating an index of the ending SR slot. Additionally, the first indicator may be a slot format indicator (SFI), the SFI may indicate formats of symbols belonging to a slot or a mini-slot, and each of the symbols may have a format of a downlink (DL) symbol, an uplink (UL) symbol, a flexible (FL) symbol, an ST symbol, or an SR symbol.

The operation method may further include receiving, from the UE, a second message including a second indicator requesting activation of the ST resources and the SR resources; and transmitting, to the UE, a third message including a third indicator indicating that the SR resources and the SR resources are activated. The third message may include at least one of information indicating a time duration for which the ST resources and the SR resources are activated and information indicating a frequency band in which the ST resources and the SR resources are configured.

Furthermore, according to the exemplary embodiments of the present disclosure, a sidelink communication method performed by a first user equipment (UE) in a communication system may include configuring sidelink transmission (ST) resources used for sidelink transmission and sidelink reception (SR) resources used for sidelink reception; transmitting, to a second UE, a first message including a first indicator that indicates the ST resources and the SR resources; and performing sidelink communication with the second UE using the ST resources and the SR resources.

The first indicator may be a slot format indicator (SFI), the SFI may indicate formats of symbols belonging to a slot or a mini-slot, and each of the symbols may have a format of a downlink (DL) symbol, an uplink (UL) symbol, a flexible (FL) symbol, an ST symbol, or an SR symbol. The first indicator may include at least one of information indicating a number of consecutive ST symbols within a slot, information indicating an index of a starting ST symbol among the consecutive ST symbols, and information indicating an index of an ending ST symbol among the consecutive ST symbols.

Further, the first indicator may include at least one of information indicating a number of consecutive SR symbols within a slot, information indicating an index of a starting SR symbol among the consecutive SR symbols, and information indicating an index of an ending SR symbol among the consecutive SR symbols. The first message may be sidelink control information (SCI), and the SCI may be transmitted to the second UE via a physical sidelink control channel (PSCCH). The ST resources and the SR resources may be resources reconfigured for the sidelink communication among UL resources preconfigured by a base station connected to the first UE.

Furthermore, according to the exemplary embodiments of the present disclosure, a first user equipment (UE) performing sidelink communication may include a processor, a transceiver operated by the processor, and a memory configured to store at least one instruction executable by the processor. Additionally, the at least one instruction may be executed by the processor to receive, from a base station, a first message including a first indicator that indicates sidelink transmission (ST) resources used for sidelink transmission and sidelink reception (SR) resources used for sidelink reception; identify the ST resources and the SR resources indicated by the first indicator included in the first message; and perform sidelink communication with a second UE using the ST resources and the SR resources.

The first indicator may be a slot format indicator (SFI), the SFI may indicate formats of symbols belonging to a slot or a mini-slot, and each of the symbols may have a format of a downlink (DL) symbol, an uplink (UL) symbol, a flexible (FL) symbol, an ST symbol, or an SR symbol. The at least one instruction may be further executed by the processor to, before performing of the sidelink communication, transmit, to the base station, a second message including a second indicator requesting activation of the ST resources and the SR resources; and receive, from the base station, a third message including a third indicator indicating that the SR resources and the SR resources are activated. The third message may include at least one of information indicating a time duration for which the ST resources and the SR resources are activated and information indicating a frequency band in which the ST resources and the SR resources are configured.

Furthermore, according to the exemplary embodiments of the present disclosure, a base station supporting sidelink communication may include a processor, a transceiver operated by the processor, and a memory configured to store at least one instruction executable by the processor. Additionally, the at least one instruction may be executed by the processor to configure sidelink transmission (ST) resources used for sidelink transmission and sidelink reception (SR) resources used for sidelink reception; generate a first message including a first indicator that indicates the ST resources and the SR resources; and transmit the first message to a user equipment (UE).

The first indicator may be a slot format indicator (SFI), the SFI may indicate formats of symbols belonging to a slot or a mini-slot, and each of the symbols may have a format of a downlink (DL) symbol, an uplink (UL) symbol, a flexible (FL) symbol, an ST symbol, or an SR symbol. The at least one instruction may be further executed by the processor to receive, from the UE, a second message including a second indicator requesting activation of the ST resources and the SR resources; and transmit, to the UE, a third message including a third indicator indicating that the SR resources and the SR resources are activated. The third message may include at least one of information indicating a time duration for which the ST resources and the SR resources are activated and information indicating a frequency band in which the ST resources and the SR resources are configured.

Furthermore, according to the exemplary embodiments of the present disclosure, a first user equipment (UE) performing sidelink communication may include a processor, a transceiver operated by the processor, and a memory configured to store at least one instruction executable by the processor. Additionally, the at least one instruction may be executed by the processor to configure sidelink transmission (ST) resources used for sidelink transmission and sidelink reception (SR) resources used for sidelink reception; transmit, to a second UE, a first message including a first indicator that indicates the ST resources and the SR resources; and perform sidelink communication with the second UE using the ST resources and the SR resources. The first indicator may be a slot format indicator (SFI), the SFI may indicate formats of symbols belonging to a slot or a mini-slot, and each of the symbols may be a format of a downlink (DL) symbol, an uplink (UL) symbol, a flexible (FL) symbol, an ST symbol, or an SR symbol.

According to the exemplary embodiments of the present disclosure, sidelink transmission (ST) resources and sidelink reception (SR) resources for sidelink communication may be configured. A specific UE may be configured to transmit a sidelink signal or channel to another UE via the ST resources and may be configured to receive a sidelink signal or channel from another UE via the SR resources. The information indicating the ST resources and the SR resources may be transmitted and received through at least one of system information, a radio resource control (RRC) message, a medium access control (MAC) control element (CE), a downlink control information (DCI), and a sidelink control information (SCI). By configuring the ST resources and the SR resources for sidelink communication, the sidelink communication may be effectively performed, and the performance of the communication system may be improved.

In addition, when interference occurs between sidelink communications performed by adjacent UEs, the sidelink communications may be performed using different time resources. In this case, the interference between sidelink communications may be reduced, and communication quality may be improved.

BRIEF DESCRIPTION OF DRAWINGS

Exemplary embodiments of the present disclosure will become more apparent by describing in detail exemplary embodiments of the present disclosure with reference to the accompanying drawings, in which.

Figure 1:
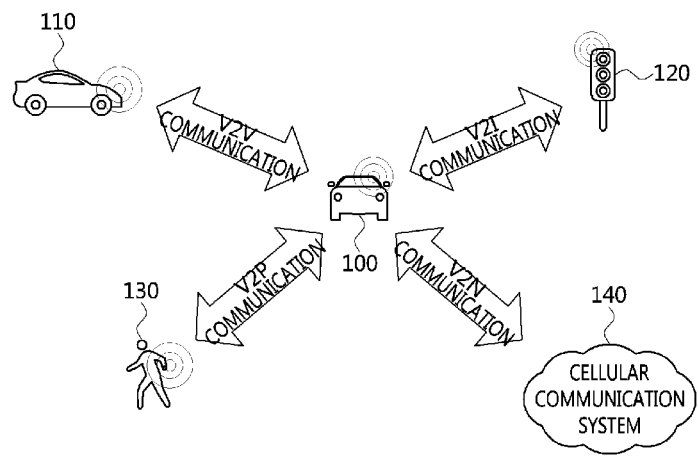
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. To facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Particularly, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100 (e.g., the first vehicle)) and a second vehicle 110 (e.g., a communication node located within the vehicle 110 (e.g., the second vehicle)). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located within the vehicle 100 or the communication node carried by the person 130 may be configured to generate an alarm that indicates a danger by detecting a dangerous situation based on the obtained driving information and movement information.

The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). In addition, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15. Meanwhile, the cellular communication system 140 that supports the V2X communications may be configured as follows.

Figure 2:
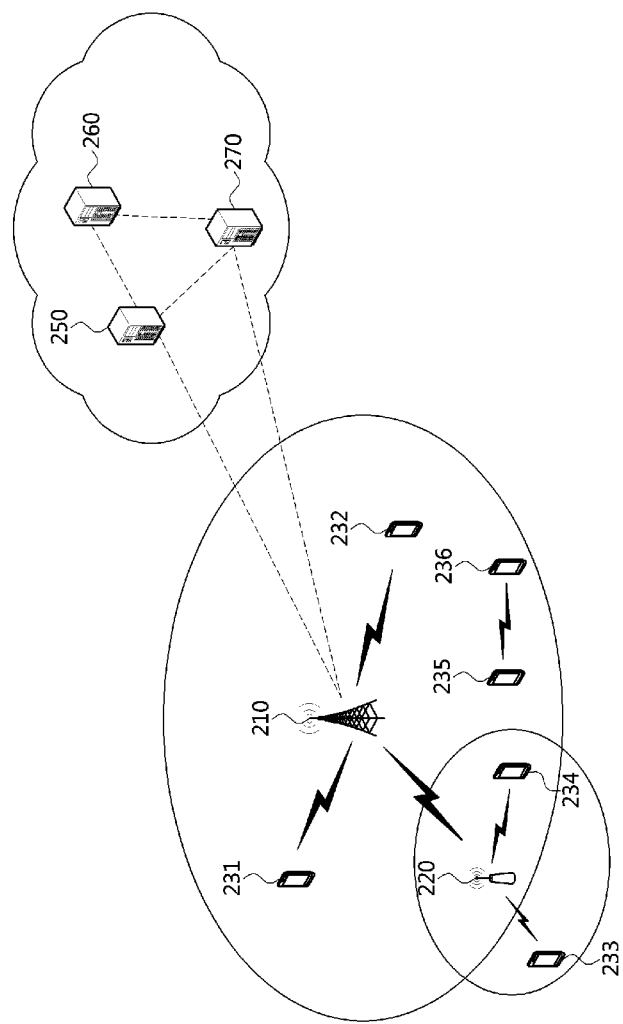
FIG. 2 is a conceptual diagram illustrating a cellular communication system according to an exemplary embodiment of the present disclosure.

FIG. 2 is a conceptual diagram illustrating exemplary embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network comprising the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may be configured to perform communication using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier PUMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology. The communication nodes (e.g., base station, relay, UE, S-GW, P-GW, MME, UPF, SMF, AMF, etc.) including the cellular communication system may be configured as follows.

Figure 3:
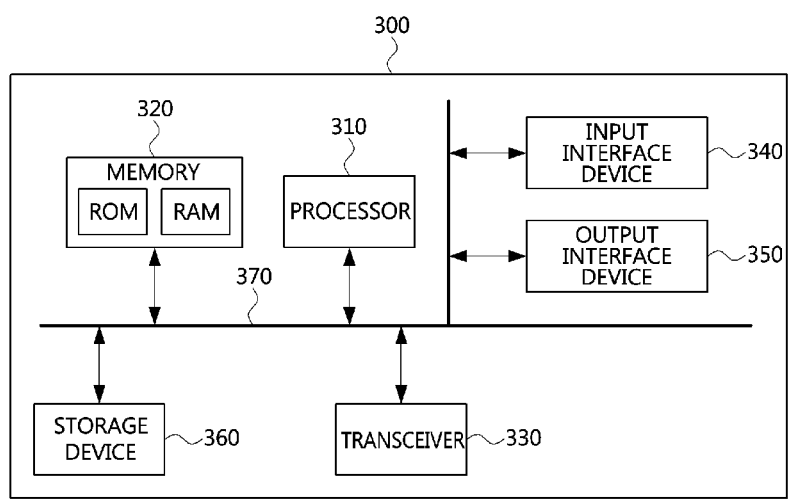
FIG. 3 is a conceptual diagram illustrating a communication node constituting a cellular communication system according to an exemplary embodiment of the present disclosure.

FIG. 3 is a conceptual diagram illustrating exemplary embodiments of a communication node constituting a cellular communication system. As shown in FIG. 3, a communication node 300 may include at least one processor 310, a memory 320, and a transceiver 330 connected to a network to perform communication. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure may be performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected therewith.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be disposed outside the cell coverage of the base station 210. The UEs 233 and 234 may be connected to the relay 220 by performing a connection establishment procedure with the relay 220. The UEs 233 and 234 may be configured to communicate with the relay 220 after being connected therewith.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations that correspond to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located within the first vehicle 100 of FIG. 1 and the UE 236 may be the communication node located within the second vehicle 110 of FIG. 1.

When V2I communications are performed using the sidelink communication technique, the UE 235 may be the communication node located within first vehicle 100 of FIG. 1 and the UE 236 may be the communication node located within the infrastructure 120 of FIG. 1.

When V2P communications are performed using the sidelink communication technique, the UE 235 may be the communication node located within first vehicle 100 of FIG. 1 and the UE 236 may be the communication node carried by the person 130 of FIG. 1.

The scenarios to which the sidelink communications are applied may be classified as shown below in Table 1 based on the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
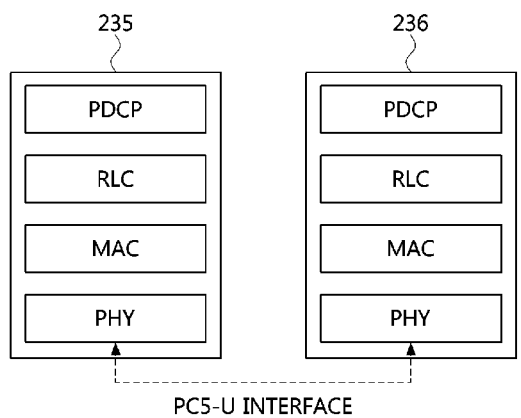
FIG. 4 is a block diagram illustrating a user plane protocol stack of an UE performing sidelink communication according to an exemplary embodiment of the present disclosure.

Meanwhile, a user plane protocol stack of the UEs (e.g., the UEs 235 and 236) performing sidelink communications may be configured as follows. FIG. 4 is a block diagram illustrating exemplary embodiments of a user plane protocol stack of an UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
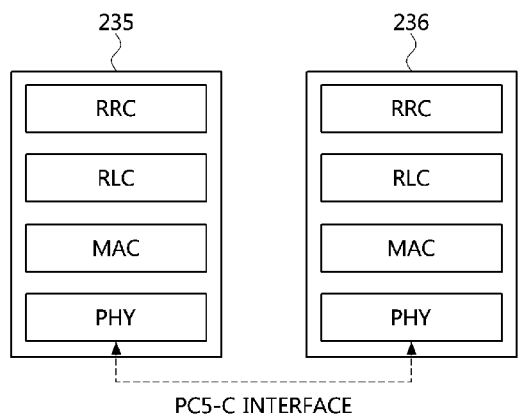
FIG. 5 is a block diagram illustrating a control plane protocol stack of an UE performing sidelink communication according to an exemplary embodiment of the present disclosure.
Figure 6:
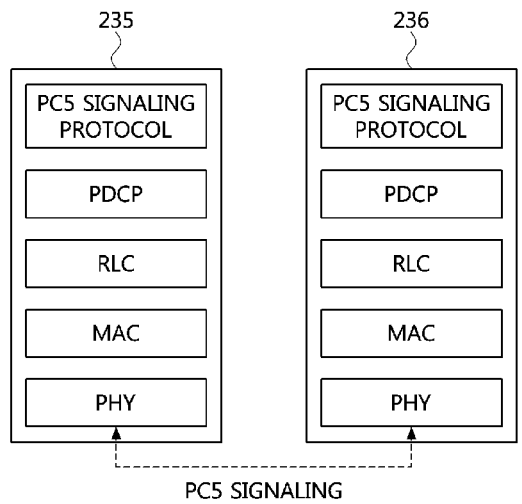
FIG. 6 is a block diagram illustrating a control plane protocol stack of an UE performing sidelink communication according to an exemplary embodiment of the present disclosure.

FIG. 5 is a block diagram illustrating a first exemplary embodiment of a control plane protocol stack of an UE that performs sidelink communication, and FIG. 6 is a block diagram illustrating a second exemplary embodiment of a control plane protocol stack of an UE that performs sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Furthermore, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. Particularly, the sidelink control information may be transmitted via resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In particular, the sidelink control information may be transmitted via resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. Particularly, the sidelink data may be transmitted and received via resources selected autonomously by the UE (e.g., UE 235 or 236) within the resource pool configured by the dedicated RRC signaling procedure or the broadcast RRC signaling procedure.

Furthermore, methods for configuring the sidelink resources described above will be described. Even when a method (e.g., transmission or reception of a signal) to be performed at a first communication node among communication nodes is described, a corresponding second communication node may be configured to perform a method (e.g., reception or transmission of the signal) that corresponds to the method performed at the first communication node. In other words, when an operation of a UE #1 (e.g., first vehicle) is described, a corresponding UE #2 (e.g., second vehicle) may be configured to perform an operation that corresponds to the operation of the UE #1.

Conversely, when an operation of the UE #2 (e.g., second vehicle) is described, the corresponding UE #1 (e.g., first vehicle) may be configured to perform an operation that corresponds to the operation of the UE #2. In the exemplary embodiments described below, the operation of the vehicle may be the operation of the communication node located within the vehicle.

In the communication system, downlink (DL) resources, uplink (UL) resources, and sidelink (SL) resources may be configured. The DL resources may be used for DL communication between the base station and the UE (e.g., vehicle). The UL resources may be used for UL communication between the base station and the UE (e.g., vehicle). The SL resources may be used for SL communication between the UEs (e.g., vehicles).

The SL resources may be classified into sidelink transmission (ST) resources (i.e., SL-TX resources) and sidelink reception (SR) resources (i.e., SL-RX resources). The ST resources may be resources used to transmit a sidelink signal or channel on a specific UE basis. The SR resources may be resources used to receive a sidelink signal or channel on a specific UE basis. The specific UE may be a UE initiating sidelink communication, a UE transmitting a PSDCH, a UE transmitting a PSBCH, or a UE transmitting a synchronization signal (e.g., PSSS, SSSS). The DL resources, UL resources, ST resources, and SR resources may be configured as follows.

Figure 7:
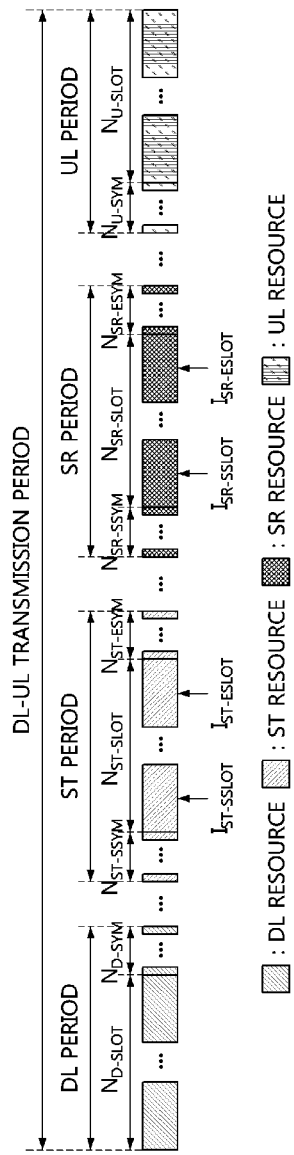
FIG. 7 is a conceptual diagram illustrating an exemplary embodiment of a DL-UL transmission period including DL resources, UL resources, ST resources, and SR resources in a communication system.

FIG. 7 is a conceptual diagram illustrating an exemplary embodiment of a DL-UL transmission period including DL resources, UL resources, ST resources, and SR resources in a communication system. As shown in FIG. 7, a DL-UL transmission period may be configured, and DL resources and UL resources may be configured within the DL-UL transmission period. Additionally, ST resources and SR resources may be additionally configured within the DL-UL transmission period. Particularly, the DL-UL transmission period may be referred to as a DL-ST-SR-UL transmission period. A resource that is not configured as a DL resource, a UL resource, an ST resource or an SR resource within the DL-UL transmission period may be configured as a flexible (FL) resource, and the FL resource may be overridden to a DL resource, a UL resource, an ST resource, or an SR resource.

The length (e.g., periodicity) of the DL-UL transmission period may be about 0.5 ms, 0.625 ms, 1 ms, 1.25 ms, 2.5 ms, 5 ms, or 10 ms. In other words, the DL-UL transmission period may be repeated about every 0.5 ms, 0.625 ms, 1 ms, 1.25 ms, 2.5 ms, 5 ms, or 10 ms in the time axis. For example, a plurality of DL-UL transmission periods may be configured consecutively in the time axis, and DL resources, UL resources, ST resources, and SR resources may be configured identically across the plurality of DL-UL transmission periods. The DL resources may be indicated by a DL pattern described in Table 3 below. In particular, a DL slot may be a slot including only of DL symbols, and a DL symbol may be used for DL communication.

TABLE 3

| DL pattern | Description |
|---|---|
| $N_{D\text{-}SLOT}$ | The number of consecutive DL slots from a starting time point of a DL-UL transmission period |
| $N_{D\text{-}SYM}$ | The number of consecutive DL symbols from an ending time point of the consecutive DL slots indicated by $N_{D\text{-}SLOT}$ |

The UL resources may be indicated by a UL pattern described in Table 4 below. In particular, a UL slot may be a slot including only of UL symbols, and a UL symbol may be used for UL communication.

TABLE 4

| UL pattern | Description |
|---|---|
| $N_{U\text{-}SLOT}$ | The number of consecutive UL slots. An ending time point of the consecutive UL slots is identical to an ending time point of a DL-UL transmission period. |
| $N_{U\text{-}SYM}$ | The number of consecutive UL symbols located before a first UL slot (i.e., starting UL slot) among the consecutive UL slots indicated by $N_{U\text{-}SLOT}$. An ending time point of the consecutive UL symbols is identical to a starting time point of the consecutive UL slots. |

The ST resources may be indicated by an ST pattern described in Table 5 below. In particular, an ST slot may be a slot including only of ST symbols, and the ST symbols may be used for SL communication. For example, the ST symbols may be used to transmit a sidelink signal or channel on a specific UE basis. When a plurality of ST periods used for SL communication are present within one DL-UL transmission period, a plurality of ST patterns may be configured. For example, when there are an ST period #1 and an ST period #2 within one DL-UL transmission period, an ST pattern #1 indicating the ST period #1 may be configured and an ST pattern #2 indicating the ST period #2 may be configured.

TABLE 5

| SL pattern | Description |
|---|---|
| $N_{ST\text{-}SLOT}$ | The number of consecutive ST slots |
| $N_{ST\text{-}SSYM}$ | The number of consecutive ST symbols located before a first ST slot (i.e., starting ST slot) among the consecutive ST slots indicated by $N_{ST\text{-}SLOT}$. An ending time point of the consecutive ST symbols is identical to a starting time point of the consecutive ST slots. |
| $N_{ST\text{-}ESYM}$ | The number of consecutive ST symbols located after a last ST slot (i.e., ending ST slot) among the consecutive ST slots indicated by $N_{ST\text{-}SLOT}$. A starting time point of the consecutive ST symbols is identical to an ending time point of the consecutive ST slots. |
| $I_{ST\text{-}SSLOT}$ | An index of the first ST slot (i.e., starting ST slot) among the consecutive ST slots indicated by $N_{ST\text{-}SLOT}$ |
| $I_{ST\text{-}ESLOT}$ | An index of the last ST slot (i.e., ending ST slot) among the consecutive ST slots indicated by $N_{ST\text{-}SLOT}$ |

The SR resources may be indicated by an SR pattern described in Table 6 below. In particular, an SR slot may be a slot including only of SR symbols, and the SR symbols may be used for SL communication. For example, the SR symbols may be used to receive a sidelink signal or channel on a specific UE basis. When a plurality of SR periods used for SL communication are present within one DL-UL transmission period, a plurality of SR patterns may be configured. For example, when there are an SR period #1 and an SR period #2 within one DL-UL transmission period, an SR pattern #1 indicating the SR period #1 may be configured and an SR pattern #2 indicating the SR period #2 may be configured.

TABLE 6

| SL pattern | Description |
|---|---|
| $N_{SR\text{-}SLOT}$ | The number of consecutive SR slots |
| $N_{SR\text{-}SSYM}$ | The number of consecutive SR symbols located before a first SR slot (i.e., starting SR slot) among the consecutive SR slots indicated by $N_{SR\text{-}SLOT}$. An ending time point of the consecutive SR symbols is identical to a starting time point of the consecutive SR slots. |
| $N_{SR\text{-}ESYM}$ | The number of consecutive SR symbols located after a last SR slot (i.e., ending SR slot) among the consecutive SR slots indicated by $N_{SR\text{-}SLOT}$. A starting time point of the consecutive SR symbols is identical to an ending time point of the consecutive SR slots. |
| $I_{SR\text{-}SSLOT}$ | An index of the first SR slot (i.e., starting SR slot) among the consecutive SR slots indicated by $N_{SR\text{-}SLOT}$ |
| $I_{SR\text{-}ESLOT}$ | An index of the last SR slot (i.e., ending SR slot) among the consecutive SR slots indicated by $N_{SR\text{-}SLOT}$ |

Figure 8:
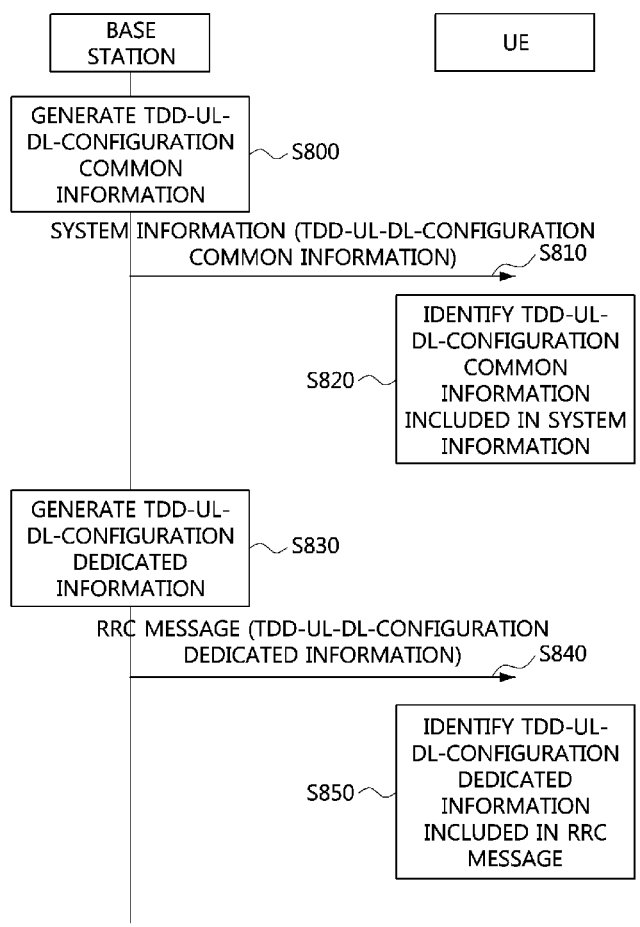
FIG. 8 is a sequence chart illustrating an exemplary embodiment of a resource configuration information signaling method in a communication system.

A method of signaling information indicating the DL resources, the UL resources, the ST resources, and the SR resources shown in FIG. 7 may be configured follows. FIG. 8 is a sequence chart illustrating an exemplary embodiment of a resource configuration information signaling method in a communication system. As shown in FIG. 8, a communication system may include a base station and a UE. The base station may be the base station 210 shown in FIG. 2, and the UE may be one of the UEs 231 to 236 shown in FIG. 2. The base station and the UE may be configured to be the same as or similar to the communication node 300 shown in FIG. 3. The UE may support the protocol stacks shown in FIGS. 4 to 6.

The base station may be configured to generate TDD-UL-DL-configuration common information (e.g., 'TDD-UL-DL-ConfigCommon') (S800). The TDD-UL-DL-configuration common information may include information that indicates a subcarrier spacing and a TDD-UL-DL-pattern #1. In addition, the TDD-UL-DL-configuration common information may further include a TDD-UL-DL-pattern #2. The TDD-UL-DL-pattern #2 may be optionally used.

The TDD-UL-DL-pattern #1 may include information that indicates a periodicity (e.g., length) of a DL-UL transmission period, a DL pattern described in Table 3, and a UL pattern described in Table 4. In addition, the TDD-UL-DL-pattern #1 may further include an ST pattern described in Table 5 and an SR pattern described in Table 6. Some parameters in the ST pattern may be included in the TDD-UL-DL-pattern #1. For example, ($I_{ST\text{-}SSLOT}$ and $I_{ST\text{-}ESLOT}$), ($I_{ST\text{-}SSLOT}$ and $N_{ST\_SLOT}$) or ($I_{ST\text{-}ESLOT}$ and $N_{ST\text{-}SLOT}$) may basically be included in TDD-UL-DL-pattern #1, and at least one of $N_{ST\text{-}SSYM}$ and $N_{ST\text{-}ESYM}$ may be further included in TDD-UL-DL-pattern #1 when there are consecutive ST symbols. Some parameters for the SR pattern may be included in the TDD-UL-DL-pattern #1. For example, ($I_{SR\text{-}SSLOT}$ and $I_{SR\text{-}ESLOT}$), ($I_{SR\text{-}SSLOT}$ and $N_{SR\_SLOT}$) or ($I_{SR\text{-}ESLOT}$ and $N_{SR\text{-}SLOT}$) may be included in TDD-UL-DL-pattern #1, and at least one of $N_{SR\text{-}SSYM}$ and $N_{SR\text{-}ESYM}$ may be further included in TDD-UL-DL-pattern #1 when there are consecutive SR symbols.

When the TDD-UL-DL-configuration common information includes the TDD-UL-DL-pattern #2, the TDD-UL-DL-pattern #2 may include at least one of a DL pattern described in Table 3, a UL pattern described in Table 4, an ST pattern described in Table 5, and an SR pattern described in Table 6. Additionally, the TDD-UL-DL-pattern #2 may further include information indicating a periodicity (e.g., length) of a DL-UL transmission period. The DL pattern, the UL pattern, the ST pattern, and the SR pattern included in the TDD-UL-DL-pattern #2 may be different from the DL pattern, the UL pattern, the ST pattern, and the SR pattern included in the TDD-UL-DL-pattern #1, respectively.

When the TDD-UL-DL-configuration common information includes the TDD-UL-DL-pattern #1 and the TDD-UL-DL-pattern #2, a DL-UL transmission period #1 according to the TDD-UL-DL-pattern #1 and a DL-UL transmission period #2 according to the TDD-UL-DL-pattern #2 may be configured in the time axis. The DL-UL transmission period #2 may be continuous with the DL-UL transmission period #1. In other words, the (DL-UL transmission period #1+DL-UL transmission period #2) may be periodically repeated in the time axis, and the length of (DL-UL transmission period #1+DL-UL transmission period #2) may be equal to or less than about 20 ms.

The base station may be configured to transmit system information (e.g., system information block (SIB)) including the TDD-UL-DL-configuration common information (S810). The UE may be configured to receive the system information from the base station, and identify the TDD-UL-DL-configuration common information included in the system information (S820). Accordingly, the UE may be configured to identify the DL-UL transmission period based on the TDD-UL-DL-configuration common information, and identify at least one of the DL resources, the UL resources, the ST resources, and the SR resources within the DL-UL transmission period. In particular, the UE may be configured to perform DL communication with the base station using the DL resources, perform UL communication with the base station using the UL resources, and perform SL communication with other UE(s) using the ST resources and the SR resources. For example, the UE may be configured to transmit a sidelink signal or channel to another UE via the ST resources, and receive a sidelink signal or channel from another UE via the SR resources.

On the other hand, the base station may further be configured to generate TDD-UL-DL-configuration dedicated information (e.g., 'TDD-UL-DL-ConfigDedicated') when necessary (S830). The TDD-UL-DL-configuration dedicated information may be used to reconfigure a FL resource (e.g., FL slot or FL symbol) configured by the TDD-UL-DL-configuration common information to a DL resource (e.g., DL slot or DL symbol), a UL resource (e.g., UL slot or UL symbol), an ST resource (e.g., ST slot or SL symbol), or an SR resource (e.g., SR slot or SR symbol). The TDD-UL-DL-configuration dedicated information may include a slot pattern described in Table 7 below. For example, the TDD-UL-DL-configuration dedicated information may include one or more parameters from among the parameters listed in Table 7 below.

TABLE 7

| Slot pattern | Description |
| --- | --- |
| $I_{SLOT}$ | Slot index |
| $A_{DL}$ | Indicates that all symbols included in a slot indicated by $I_{SLOT}$ are DL symbols. |
| $A_{UL}$ | Indicates that all symbols included in a slot indicated by $I_{SLOT}$ are UL symbols. |
| $A_{SL}$ | Indicates that all symbols included in a slot indicated by $I_{SLOT}$ are SL symbols. |
| $N_{D\text{-}SYM\text{-}SLOT}$ | The number of DL symbols among all symbols included in a slot indicated by $I_{SLOT}$. A starting time point of the DL symbols is identical to a starting time point of the corresponding slot. |
| $N_{U\text{-}SYM\text{-}SLOT}$ | The number of UL symbols among all symbols included in a slot indicated by $I_{SLOT}$. An ending time point of the UL symbols is identical to an ending time point of the corresponding slot. |
| $N_{ST\text{-}SYM\text{-}SLOT}$ | The number of ST symbols among all symbols included in a slot indicated by $I_{SLOT}$. |
| $I_{ST\text{-}SSYM}$ | An index of a first ST symbol (i.e., starting ST symbol) among consecutive ST symbols indicated by $N_{ST\text{-}SYM\text{-}SLOT}$. |
| $I_{ST\text{-}ESYM}$ | An index of a last ST symbol (i.e., ending ST symbol) among consecutive ST symbols indicated by $N_{ST\text{-}SYM\text{-}SLOT}$. |
| $N_{SR\text{-}SYM\text{-}SLOT}$ | The number of SR symbols among all symbols included in a slot indicated by $I_{SLOT}$. |
| $I_{SR\text{-}SSYM}$ | An index of a first SR symbol (i.e., starting SR symbol) among consecutive SR symbols indicated by $N_{SR\text{-}SYM\text{-}SLOT}$. |
| $I_{SR\text{-}ESYM}$ | An index of a last SR symbol (i.e., ending SR symbol) among consecutive SR symbols indicated by $N_{SR\text{-}SYM\text{-}SLOT}$. |

A slot configured by the TDD-UL-DL-configuration dedicated information may be as follows.

Figure 9:
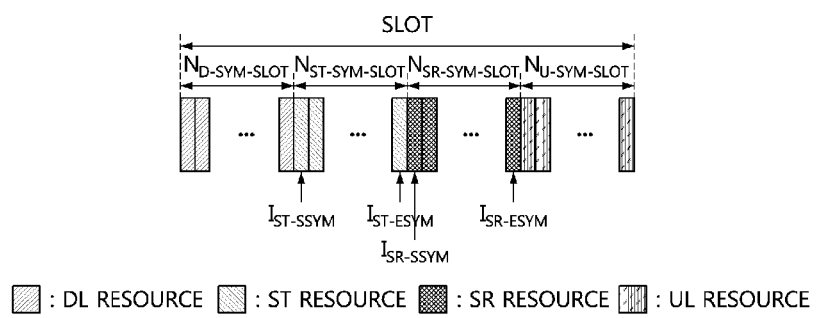
FIG. 9 is a conceptual diagram illustrating an exemplary embodiment of a slot configured by TDD-UL-DL-configuration dedicated information in a communication system.

FIG. 9 is a conceptual diagram illustrating an exemplary embodiment of a slot configured by TDD-UL-DL-configuration dedicated information in a communication system. As shown in FIG. 9, symbols included in one slot may be configured as DL symbols, UL symbols, ST symbols, or SR symbols according to the TDD-UL-DL-configuration dedicated information. In particular, one slot may not include an FL symbol.

Figure 10:
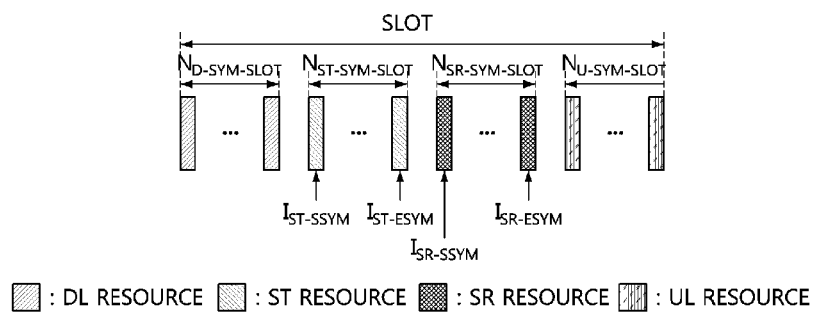
FIG. 10 is a conceptual diagram illustrating an exemplary embodiment of a slot configured by TDD-UL-DL-configuration dedicated information in a communication system.

FIG. 10 is a conceptual diagram illustrating an exemplary embodiment of a slot configured by TDD-UL-DL-configuration dedicated information in a communication system. As shown in FIG. 10, symbols included in one slot may be configured as DL symbols, UL symbols, ST symbols, or SR symbols according to the TDD-UL-DL-configuration dedicated information. Among the symbols included in one slot, a symbol that is not configured as a DL symbol, a UL symbol, an ST symbol, or an SR symbol may be an FL symbol.

Referring again to FIG. 8, the base station may be configured to transmit an RRC message including the TDD-UL-DL-configuration dedicated information to the UE (S840). The RRC message including the TDD-UL-DL-configuration dedicated information may be a cell-specific RRC message or a UE-specific RRC message. The UE may be configured to receive the RRC message from the base station and identify the TDD-UL-DL-configuration dedicated information included in the RRC message (S850). Accordingly, the UE may be configured to identify at least one of the DL resources, the UL resources, the ST resources, and the SR resources configured by the TDD-UL-DL-configuration common information and the TDD-UL-DL-configuration dedicated information. In particular, the UE may be configured to perform DL communication with the base station using the DL resources, perform UL communication with the base station using the UL resources, and perform SL communication with other UE(s) using the ST and SR resources. For example, the UE may be configured to transmit a sidelink signal or channel to another UE via the ST resources, and receive a sidelink signal or channel from another UE via the SR resources.

Meanwhile, when the ST resources and the SR resources configured by the TDD-UL-DL-configuration common information or (TDD-UL-DL-configuration common information+TDD-UL-DL-configuration dedicated information) are activated by the base station, the UE may be configured to perform the sidelink communication using the activated ST resources and the SR resources. The activation procedure of the ST resources and the SR resources may be performed as follows. The activation procedure of the ST resources and the SR resources may be selectively performed.

Figure 11:
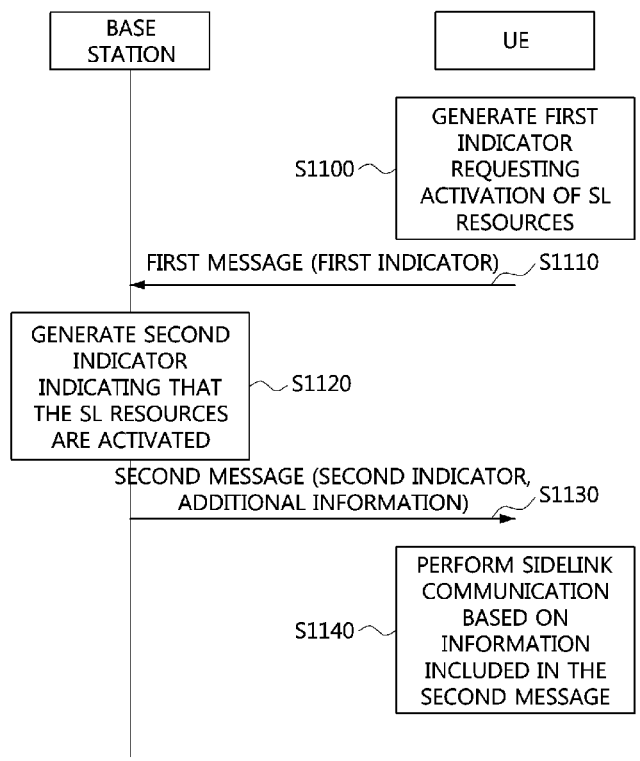
FIG. 11 is a sequence chart illustrating an exemplary embodiment of a method of activating ST resources and SR resources in a communication system.

FIG. 11 is a sequence chart illustrating an exemplary embodiment of a method of activating ST resources and SR resources in a communication system. As shown in FIG. 11, a communication system may include a base station and a UE. The base station may be the base station 210 shown in FIG. 2, and the UE may be one of the UEs 231 to 236 shown in FIG. 2. The base station and the UE may be configured to be the same as or similar to the communication node 300 shown in FIG. 3. The UE may support the protocol stacks shown in FIGS. 4 to 6. The steps shown in FIG. 11 may be performed after the steps shown in FIG. 8 are completed.

A UE desiring to perform sidelink communication may be configured to generate a first indicator requesting activation of resources (e.g., ST resources and SR resources) for the sidelink communication (S1100). The resources for the sidelink communication may be ST resources and SR resources configured by the TDD-UL-DL-configuration common information or (TDD-UL-DL-configuration common information+TDD-UL-DL-configuration dedicated information). The first indicator may be a scheduling request (SR) for sidelink communication. The UE may be configured to transmit a first message including the first indicator to the base station (S1110). The first message may be uplink control information (UCI), and the first message may be transmitted to the base station via a physical uplink control channel (PUCCH).

The base station may then be configured to receive the first message from the UE, and identify that the activation of the resources for sidelink communication is requested based on the first indicator included in the first message. When the resources for the sidelink communication are available, the base station may be configured to generate a second indicator indicating that the resources for the sidelink communication are activated (S1120). Additionally, the base station may be configured to generate a second message including the second indicator. The second message may further include one or more of information (e.g., a slot index or a subframe index) that indicates an activation time point of the resources for sidelink communication, information (e.g., duration) that indicates an activation time of the resources for sidelink communication, and information (e.g., index of a bandwidth part) that indicates a frequency band in which the resources for sidelink communication are configured.

The base station may be configured to transmit the second message to the UE (S1130). The second message may be transmitted to the UE through one or more of system information, an RRC message, a MAC control element (CE), and a DCI. The UE may be configured to obtain the second message by receiving at least one of the system information, the RRC message, the MAC CE, and the DCI. The UE may be configured to perform the sidelink communication based on the information included in the second message (S1140).

For example, when the second indicator included in the second message is identified, the UE may be configured to determine that the resources for sidelink communication are activated. In addition, based on the information included in the second message, the UE may be configured to identify a time duration for which the resources for sidelink communication are activated, and identify the frequency band in which the resources for sidelink communication are configured. Accordingly, the UE may be configured to perform sidelink communications using the identified time-frequency resources.

On the other hand, the resource (e.g., DL resource, UL resource, ST resource, or SR resource) configured by the TDD-UL-DL-configuration common information or the (TDD-UL-DL-configuration common information+TDD-UL-DL-configuration dedicated information) may be reconfigured by a slot format indicator (SFI). The resource reconfiguration procedure based on the SFI may be performed as follows.

Figure 12:
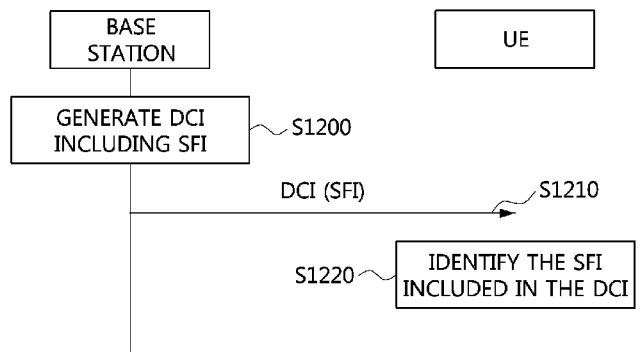
FIG. 12 is a sequence chart illustrating an exemplary embodiment of a resource reconfiguration method based on an SFI in a communication system.

FIG. 12 is a sequence chart illustrating an exemplary embodiment of a resource reconfiguration method based on an SFI in a communication system. As shown in FIG. 12, a communication system may include a base station and a UE. The base station may be the base station 210 shown in FIG. 2, and the UE may be one of the UEs 231 to 236 shown in FIG. 2. The base station and the UE may be configured to be the same as or similar to the communication node 300 shown in FIG. 3. The UE may support the protocol stacks shown in FIGS. 4 to 6. The steps shown in FIG. 12 may be performed after the steps shown in FIG. 11 are completed.

The SFI may be used to reconfigure a FL resource configured by the TDD-UL-DL-configuration common information or the (TDD-UL-DL-configuration common information+TDD-UL-DL-configuration dedicated information) to a DL symbol, a UL symbol, an ST symbol, or an SR symbol. The SFI may be configured as shown in Table 8 below. The SFI are not limited to examples shown in Table 8 below, and may be configured variously. In Table 8, 'D' may indicate a DL symbol, 'U' may indicate a UL symbol, 'ST' may indicate an ST symbol, 'SR' may indicated an SR symbol, and 'F' may indicate an FL symbol.

The base station may be configured to transmit a message including the information described in Table 8 to the UE by using at least one of system information, an RRC message, a MAC CE, or downlink control information (DCI). The UE may be configured to identify the information described in Table 8 by receiving at least one of the system information, the RRC message, the MAC CE, or the DCI. Alternatively, the information described in Table 8 may be defined in the 3GPP specification, and the base station and the UE may be configured to identify the information described in Table 8 based on the 3GPP specification.

TABLE 8

| Index | \multicolumn{14}{c}{Symbol index in Slot} | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 56 | ST | ST | ST | ST | ST | ST | ST | ST | ST | ST | ST | ST | ST | ST |
| 57 | SR | SR | SR | SR | SR | SR | SR | SR | SR | SR | SR | SR | SR | SR |
| 58 | ST | ST | ST | ST | ST | ST | ST | SR | SR | SR | SR | SR | SR | SR |
| 59 | D | D | D | D | D | D | D | D | D | D | ST | ST | ST | ST |
| 60 | U | U | U | U | U | U | U | U | U | U | ST | ST | ST | ST |
| 61 | D | D | D | D | D | D | D | U | U | U | U | ST | ST | ST |
| 62 | D | D | D | D | D | D | D | D | D | D | SR | SR | SR | SR |
| 63 | U | U | U | U | U | U | U | U | U | U | SR | SR | SR | SR |
| 64 | D | D | D | D | D | D | D | U | U | U | U | SR | SR | SR |
| 65 | D | D | D | D | D | D | D | ST | ST | ST | ST | SR | SR | SRT |
| 66 | U | U | U | U | U | U | U | ST | ST | ST | ST | SR | SR | SRT |
| 67 | D | D | D | D | D | U | U | U | U | U | ST | ST | SR | SR |
| 68 | F | F | F | F | F | F | F | F | F | F | F | F | F | F |
| 69 | ST | ST | ST | ST | SR | SR | SR | | | | | | | |
| 70 | | | | | | | | ST | ST | ST | ST | SR | SR | SR |
| 71 | | | ST | ST | F | SR | | | | | | | | |
| 72 | | | ST | F | SR | SR | SR | | | | | | | |
| 73 | | | ST | ST | SR | SR | SR | | | | | | | |

The SFIs #56 to #68 may indicate formats of a slot composed of 14 symbols. The SFIs #69 to #73 may indicate formats of a slot (e.g., a mini-slot) composed of less than 14 symbols. For example, the SFIs #69 and #70 may indicate formats of a mini-slot including 7 symbols, the SFI #71 may indicate a format of a mini-slot including 4 symbols, and the SFIs #72 and #73 may indicate formats of a mini-slot including 5 symbols.

The slot formats defined in Table 8 may be used by UEs not within the coverage of the base station as well as within the coverage of the base station. A UE operating in an RRC connected state within the coverage of the base station may be configured to perform UL communication using the UL symbols defined in Table 8, perform DL communication using the DL symbols defined in Table 8, and perform sidelink communication using the ST symbols and the SR symbols defined in Table 8. A UE operating in an RRC inactive state or an RRC idle state within the coverage of the base station may be configured to perform sidelink communication using the ST symbols and the SR symbols defined in Table 8. A UE outside the coverage of the base station may be configured to perform sidelink communication using the ST symbols and the SR symbols defined in Table 8.

The base station may be configured to generate a DCI including an SFI (S1200). The DCI including the SFI may be a DCI format 2_0. The DCI may include two or more different SFIs. For example, when a DCI includes a first SFI and a second SFI, the first SFI may be applied to a slot #n (or, mini-slot #n), and the second SFI may be applied to a slot #n+1 (or, mini-slot #n+1). Notably, n may be an integer equal to or greater than 0.

The base station may be configured to transmit the DCI including the SFI to the UE through a physical downlink control channel (PDCCH) (S1210). The UE may be configured to receive the DCI from the base station and identify the SFI included in the DCI (S1220). Accordingly, the UE may be configured to identify one or more of the DL resources, the UL resources, the ST resources, and the SR resources configured by (TDD-UL-DL-configuration common information+DCI) or (TDD-UL-DL-configuration common information+TDD-UL-DL-configuration dedicated information+DCI). In particular, the UE may be configured to perform DL communication with the base station using the DL resources, and perform UL communication with the base station using the UL resources. Alternatively, the UE may be configured to transmit a sidelink signal or channel to another UE via the ST resources, and receive a sidelink signal or channel from another UE via the SR resources.

Figure 13:
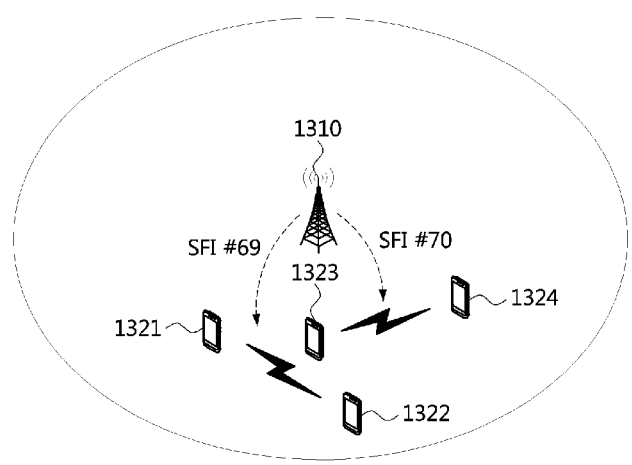
FIG. 13 is a conceptual diagram illustrating an exemplary embodiment of a method of configuring an SFI in a communication system.

Meanwhile, the base station may configure the SFI based on the interference between the UEs performing sidelink communication. A procedure for configuring the SFI in consideration of the interference between the UEs may be performed as follows. FIG. 13 is a conceptual diagram illustrating an exemplary embodiment of a method of configuring an SFI in a communication system.

As shown in FIG. 13, a communication system may include a base station 1310, a UE #1 1321, a UE #2 1322, a UE #3 1323, and a UE #4 1324. The base station may be the base station 210 shown in FIG. 2, and each of the UE #1 1321, UE #2 1322, UE #3 1323, and UE #4 1324 may be one of the UEs 231 to 236 shown in FIG. 2. The base station and the UEs #1 to #4 may be configured to be the same as or similar to the communication node 300 shown in FIG. 3. The UEs #1 to #4 may support the protocol stacks shown in FIGS. 4 to 6.

The UE #1 may be configured to perform sidelink communication (hereinafter referred to as 'sidelink communication #1') with the UE #2, and the UE #3 may be configured to perform sidelink communication (hereinafter referred to as 'sidelink communication #2') with the UE #4. When resources used for the sidelink communication #1 overlap with resources used for the sidelink communication #2, interference may occur. Accordingly, the base station may configure the resources used for the sidelink communication #1 differently from the resources used for the sidelink communication #2.

For example, the base station may be configured to transmit a DCI including the SFI #69 defined in Table 8 to the UE #1 and the UE #2, and a DCI including the SFI #70 defined in Table 8 to the UE #3 and the UE #4. In particular, the sidelink communication #1 may be performed using symbols #0 to #6 indicated by the SFI #69 within a slot, and the sidelink communication #2 may be performed using symbols #7 to #13 indicated by the SFI #70 within the slot. Therefore, interference may be prevented between the sidelink communication #1 and the sidelink communication #2.

Figure 14:
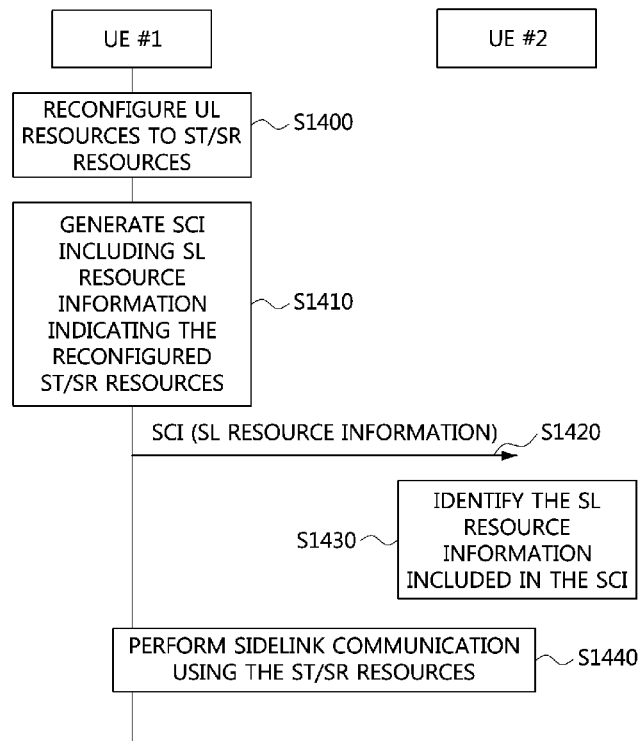
FIG. 14 is a sequence chart illustrating an exemplary embodiment of a sidelink communication method in a communication system.

Meanwhile, ST resources and SR resources may be configured by the UE, and the sidelink communication may be performed using the ST resources and the SR resources configured by the UE. FIG. 14 is a sequence chart illustrating an exemplary embodiment of a sidelink communication method in a communication system.

As shown in FIG. 14, a communication system may include a UE #1 and a UE #2. For example, the UE #1 may be the UE 235 shown in FIG. 2, and the UE #2 may be the UE 236 shown in FIG. 2. Each of the UE #1 and the UE #2 may be connected to a base station and may be located within the coverage of the base station. Alternatively, the UE #2 may be located outside the coverage of the base station. The UE #1 and the UE #2 may be configured to be the same or similar to the communication node 300 shown in FIG. 3. The UE #1 and the UE #2 may support the protocol stacks shown in FIGS. 4 to 6.

The UE #1 may reconfigure the UL resources configured through at least one of UL-DL-configuration common information, UL-DL-configuration dedicated information, and a DCI to ST resources or SR resources (S1400). The UE #1 may also reconfigure the FL resources configured through at least one of UL-DL-configuration common information, UL-DL-configuration dedicated information, and a DCI to ST resources or SR resources. Alternatively, the ST resources and the SR resources may be configured within a resource pool for sidelink communication. The UE #1 may be configured to generate sidelink control information (SCI) including SL resource information indicating the reconfigured ST resources or SR resources (S1410). The SL resource information may include one or more of parameters listed in Table 9 below.

TABLE 9

| SL resource information | Description |
|---|---|
| $I_{SLOT}$ | Slot index |
| $N'_{ST-SYM-SLOT}$ | The number of consecutive FL/UL symbols reconfigured to ST symbols among FL/UL symbols included in a slot indicated by $I_{SLOT}$ |
| $I'_{ST-SSYM}$ | An index of a first ST symbol (i.e., starting ST symbol) among consecutive ST symbols indicated by $N'_{ST-SYM-SLOT}$ |
| $I'_{ST-ESYM}$ | An index of a last ST symbol (i.e., ending ST symbol) among consecutive ST symbols indicated by $N'_{ST-SYM-SLOT}$ |
| $N'_{SR-SYM-SLOT}$ | The number of consecutive FL/UL symbols reconfigured to SR symbols among FL/UL symbols included in a slot indicated by $I_{SLOT}$ |
| $I'_{SR-SSYM}$ | An index of a first SR symbol (i.e., starting SR symbol) among consecutive SR symbols indicated by $N'_{SR-SYM-SLOT}$ |
| $I'_{SR-ESYM}$ | An index of a last SR symbol (i.e., ending SR symbol) among consecutive SR symbols indicated by $N'_{SR-SYM-SLOT}$ |

As follows, UL symbols included in a specific slot may be overridden by ST symbols or SR symbols by the SL resource information.

Figure 15:
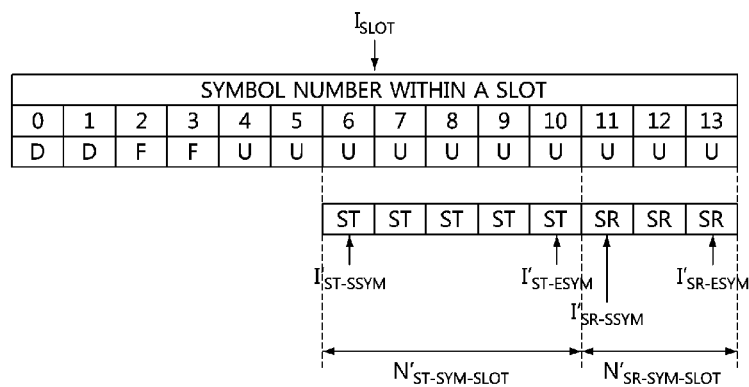
FIG. 15 is a conceptual diagram illustrating an exemplary embodiment of a slot configured by SL resource information in a communication system.

FIG. 15 is a conceptual diagram illustrating an exemplary embodiment of a slot configured by SL resource information in a communication system. As shown in FIG. 15, each of symbols included in one slot may be configured as a DL symbol, a UL symbol, or an FL symbol by at least one of UL-DL-configuration common information, UL-DL-configuration dedicated information, and a DCI. Some UL symbols among UL symbols included in one slot may be reconfigured to ST symbols or SR symbols by the SL resource information. Particularly, 'D' may be a DL symbol, 'U' may be a UL symbol, 'F' may be an FL symbol, 'ST' may be an ST symbol, and 'SR' may be an SR symbol.

Referring again to FIG. 14, the UE #1 may be configured to transmit an SCI including the SL resource information to the UE #2 (S1420). The SCI may be transmitted via a PSCCH. The UE #2 may be configured to receive the SCI from the UE #1, and identify the SL resource information included in the SCI (S1430). The UE #1 and the UE #2 may be configured to perform sidelink communication using the SL resources indicated by the SL resource information included in the SCI (S1440).

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A sidelink communication method performed by a first user equipment (UE) in a communication system, comprising:

receiving, from a base station, a first message including a first indicator that indicates sidelink transmission (ST) resources used for sidelink transmission and sidelink reception (SR) resources used for sidelink reception;

identifying, by a processor of the first UE, the ST resources and the SR resources indicated by the first indicator included in the first message;

transmitting, by the processor, to the base station, a second message including a second indicator requesting activation of the ST resources and the SR resources; and receiving, at the processor, from the base station, a third message including a third indicator indicating that the activation is approved and resource information including one or more SR resources and one or more SR resources activated by the third indicator among the ST resources and the SR resources which are configured by the base station; and performing, by the processor, sidelink communication with a second UE using the one or more ST resources and the one or more SR resources activated by the third message, and wherein the first indicator indicates a number of consecutive ST symbols within a slot, information indicating an index of a starting ST symbol among the consecutive ST symbols, information indicating an index of an ending ST symbol among the consecutive ST symbols, information indicating a number of consecutive SR symbols within the slot, information indicating an index of a starting SR symbol among the consecutive SR symbols, and information indicating an index of an ending SR symbol among the consecutive SR symbols.

2. The sidelink communication method according to claim 1, wherein the first indicator further indicates at least one selected from the group consisting of:
information indicating a number of consecutive ST slots used for the sidelink transmission, information indicating a number of consecutive ST symbols located before a starting ST slot among the consecutive ST slots, information indicating a number of consecutive ST symbols located after an ending ST slot among the consecutive ST slots, information indicating an index of the starting ST slot, and information indicating an index of the ending ST slot.

3. The sidelink communication method according to claim 1, wherein the first indicator further indicates at least one selected from the group consisting of:
information indicating a number of consecutive SR slots used for the sidelink reception, information indicating a number of consecutive SR symbols located before a starting SR slot among the consecutive SR slots, information indicating a number of consecutive SR symbols located after an ending SR slot among the consecutive SR slots, information indicating an index of the starting SR slot, and information indicating an index of the ending SR slot.

4. The sidelink communication method according to claim 1, wherein the first indicator is a slot format indicator (SFI), the SFI indicates formats of symbols belonging to a slot or a mini-slot, and each of the symbols has a format of a downlink (DL) symbol, an uplink (UL) symbol, a flexible (FL) symbol, an ST symbol, or an SR symbol.

5. The sidelink communication method according to claim 1, wherein the first message is received through one or more of system information, a radio resource control (RRC) message, a medium access control (MAC) control element (CE), and a downlink control information (DCI).

6. The sidelink communication method according to claim 1, wherein the second message is uplink control information (UCI), and the UCI is transmitted to the base station via a physical uplink control channel (PUCCH).

7. The sidelink communication method according to claim 1, wherein the resource information includes at least one of information indicating a time duration for which the one or more ST resources and the one or more SR resources are activated and information indicating a frequency band in which the one or more ST resources and the one or more SR resources are configured.

8. An operation method of a base station supporting sidelink communication in a communication system, comprising:
configuring, by a processor of the base station, sidelink transmission (ST) resources used for sidelink transmission and sidelink reception (SR) resources used for sidelink reception;
generating, by the processor, a first message including a first indicator indicating the ST resources and the SR resources;
transmitting, by the processor, the first message to a user equipment (UE);
receiving, by the processor from the UE, a second message including a second indicator requesting activation of the ST resources and the SR resources; and
transmitting, by the processor to the UE, a third message including a third indicator indicating that the activation is approved and resource information indicating one or more SR resources and one or more SR resources activated by the third indicator among the ST resources and the SR resources which are configured by the base station,
wherein the one or more ST resources and the one or more SR resources are used for the sidelink communication in the UE, and
wherein the first indicator indicates a number of consecutive ST symbols within a slot, information indicating an index of a starting ST symbol among the consecutive ST symbols, information indicating an index of an ending ST symbol among the consecutive ST symbols, information indicating a number of consecutive SR symbols within the slot, information indicating an index of a starting SR symbol among the consecutive SR symbols, and information indicating an index of an ending SR symbol among the consecutive SR symbols.

9. The operation method according to claim 8, wherein the first indicator further indicates at least one selected from the group consisting of: information indicating a number of consecutive ST slots used for the sidelink transmission, information indicating a number of consecutive ST symbols located before a starting ST slot among the consecutive ST slots, information indicating a number of consecutive ST symbols located after an ending ST slot among the consecutive ST slots, information indicating an index of the starting ST slot, and information indicating an index of the ending ST slot.

10. The operation method according to claim 8, wherein the first indicator further indicates at least one selected from the group consisting of: information indicating a number of consecutive SR slots used for the sidelink reception, information indicating a number of consecutive SR symbols located before a starting SR slot among the consecutive SR slots, information indicating a number of consecutive SR symbols located after an ending SR slot among the consecutive SR slots, information indicating an index of the starting SR slot, and information indicating an index of the ending SR slot.

11. The operation method according to claim 8, wherein the first indicator is a slot format indicator (SFI), the SFI indicates formats of symbols belonging to a slot or a mini-slot, and each of the symbols has a format of a downlink (DL) symbol, an uplink (UL) symbol, a flexible (FL) symbol, an ST symbol, or an SR symbol.

12. The operation method according to claim 8, wherein the resource information includes at least one of information indicating a time duration for which the one or more ST resources and the one or more SR resources are activated and information indicating a frequency band in which the one or more ST resources and the one or more SR resources are configured.

13. A sidelink communication method performed by a first user equipment (UE) in a communication system, comprising:
configuring, by a processor of the first UE, sidelink transmission (ST) resources used for sidelink transmission and sidelink reception (SR) resources used for sidelink reception;
transmitting, by the processor to a second UE, a first message including information indicating a number of consecutive ST symbols within a slot, information indicating an index of a starting ST symbol among the consecutive ST symbols, information indicating an index of an ending ST symbol among the consecutive ST symbols, information indicating a number of consecutive SR symbols within the slot, information indicating an index of a starting SR symbol among the consecutive SR symbols, and information indicating an index of an ending SR symbol among the consecutive SR symbols; and performing, by the processor, sidelink communication with the second UE using the ST resources and the SR resources.

14. The sidelink communication method according to claim 13, wherein the first message is sidelink control information (SCI), and the SCI is transmitted to the second UE via a physical sidelink control channel (PSCCH).

15. The sidelink communication method according to claim 13, wherein the ST resources and the SR resources are resources reconfigured for the sidelink communication among UL resources preconfigured by a base station connected to the first UE.

* * * * *

UNITED STATES PATENT AND TRADEMARK OFFICE
CERTIFICATE OF CORRECTION

PATENT NO. : 11,191,074 B2
APPLICATION NO. : 16/553694
DATED : November 30, 2021
INVENTOR(S) : Su Han Choi et al.

Page 1 of 1

It is certified that error appears in the above-identified patent and that said Letters Patent is hereby corrected as shown below:

On the Title Page

In (71) Applicants, please replace:
"Hyundai Motor Company, Seoul (KR);
Kia Motors Corporation, Seoul (KR);
Industry-Academic Cooperation Foundation, Dankook University,
Gyeonggi-do (KR)"
With:
"Hyundai Motor Company, Seoul (KR);
Kia Motors Corporation, Seoul (KR)"

In (73) Assignees, please replace:
"Hyundai Motor Company, Seoul (KR);
Kia Motors Corporation, Seoul (KR);
Industry-Academic Cooperation Foundation, Dankook University,
Gyeonggi-do (KR)"
With:
"Hyundai Motor Company, Seoul (KR);
Kia Motors Corporation, Seoul (KR)"

Signed and Sealed this
First Day of April, 2025

Coke Morgan Stewart
*Acting Director of the United States Patent and Trademark Office*